(12) United States Patent
Olivegren

(10) Patent No.: US 12,006,713 B2
(45) Date of Patent: Jun. 11, 2024

(54) LAMINATED WOOD TOWER AND METHOD FOR ASSEMBLY OF A LAMINATED WOOD TOWER

(71) Applicant: MODVION AB, Gothenburg (SE)

(72) Inventor: David Olivegren, Gothenburg (SE)

(73) Assignee: MODVION AB, Hisings Backa (SE)

( * ) Notice: Subject to any disclaimer, the term of this patent is extended or adjusted under 35 U.S.C. 154(b) by 383 days.

(21) Appl. No.: 17/423,441

(22) PCT Filed: Jan. 16, 2020

(86) PCT No.: PCT/SE2020/050039
§ 371 (c)(1),
(2) Date: Jul. 15, 2021

(87) PCT Pub. No.: WO2020/149784
PCT Pub. Date: Jul. 23, 2020

(65) Prior Publication Data
US 2022/0064979 A1 Mar. 3, 2022

(30) Foreign Application Priority Data
Jan. 16, 2019 (SE) .................................. 1950055-2

(51) Int. Cl.
*E04H 12/04* (2006.01)
*B32B 1/08* (2006.01)
(Continued)

(52) U.S. Cl.
CPC .............. *E04H 12/04* (2013.01); *B32B 1/08* (2013.01); *B32B 5/12* (2013.01); *B32B 21/13* (2013.01);
(Continued)

(58) Field of Classification Search
CPC ...................................................... E04H 12/07
See application file for complete search history.

(56) References Cited

U.S. PATENT DOCUMENTS 2,043,026 A 6/1936 Arnold
2,091,861 A * 8/1937 Junge ...................... E04H 12/04
52/847
(Continued)

FOREIGN PATENT DOCUMENTS

CA 1184014 A 3/1985
CA 1325096 C 12/1993
(Continued)

OTHER PUBLICATIONS

European Search Report, European Application No. 20740988.9, dated Sep. 16, 2022.
(Continued)

*Primary Examiner* — Christine T Cajilig
(74) *Attorney, Agent, or Firm* — MARSHALL, GERSTEIN & BORUN LLP

(57) ABSTRACT

Laminated wood tower including a plurality of curved modules attached to each other, where each curved module includes a plurality of layers, where each layer includes a plurality of laminated plies, and where a layer includes a first set of plies, where the first set of plies includes a plurality of plies arranged adjacent each other and where the wood grain is directed in a first direction, and a second set of plies, where the second set of plies includes one or more plies arranged adjacent each other and where the wood grain is directed in a second direction, where the first direction is perpendicular to the second direction. The advantage is that a self-supporting laminated wood tower can be obtained in an easy and cost-effective way.

15 Claims, 8 Drawing Sheets

(51) Int. Cl.
   *B32B 5/12* (2006.01)
   *B32B 21/13* (2006.01)
   *B32B 21/14* (2006.01)
   *F03D 13/20* (2016.01)

(52) U.S. Cl.
   CPC .......... *B32B 21/14* (2013.01); *B32B 2419/00* (2013.01); *F03D 13/20* (2016.05); *F05B 2240/912* (2013.01); *F05B 2280/4002* (2013.01)

(56) References Cited

U.S. PATENT DOCUMENTS

| | | | | |
|---|---|---|---|---|
| 2,267,888 | A * | 12/1941 | Arnold | B65D 9/32 229/5.5 |
| 5,576,082 | A * | 11/1996 | Jarrett | B32B 3/30 138/155 |
| 8,173,236 | B1 * | 5/2012 | McDonald | B32B 37/24 428/50 |
| 10,195,821 | B1 * | 2/2019 | McDonald | B32B 9/04 |
| 2004/0213952 | A1 * | 10/2004 | Takemura | B32B 5/12 428/113 |
| 2005/0247025 | A1 | 11/2005 | Coronado | |
| 2012/0047840 | A1 * | 3/2012 | Gregor | E04H 12/04 52/173.1 |

FOREIGN PATENT DOCUMENTS

| | | | | |
|---|---|---|---|---|
| EP | 0532376 | A2 | 3/1993 | |
| EP | 1876316 | A1 * | 1/2008 | ............ E04H 12/12 |
| EP | 3056636 | A1 | 8/2016 | |
| EP | 3127695 | A1 | 2/2017 | |
| GB | 126045 | A * | 5/1919 | |
| WO | WO-2010121733 | A2 | 10/2010 | |
| WO | WO-2014031066 | A1 | 2/2014 | |
| WO | WO-2014182231 | A1 | 11/2014 | |
| WO | WO-2016119059 | A1 | 8/2016 | |
| WO | WO-2017058095 | A1 | 4/2017 | |

OTHER PUBLICATIONS

International Search Report and Written Opinion received for PCT/SE2020/050039 dated Apr. 1, 2020.
Search Report received for SE 1950055-2 dated Aug. 30, 2019.

* cited by examiner

LAMINATED WOOD TOWER AND METHOD FOR ASSEMBLY OF A LAMINATED WOOD TOWER

TECHNICAL FIELD

The present invention relates to a laminated wood tower comprising a plurality of curved modules. Each curved module is solid and comprises a plurality of wooden layers, where each layer comprises a plurality of laminated plies.

BACKGROUND ART

High towers are used for a number of different purposes. They may e.g. be used as transmitter masts or for wind power installations. A typical wind power installation is provided with a tower made of steel or concrete. The tower is attached to the ground by a foundation and the tower is provided with a nacelle at the top of the tower, holding the generator, the transmission and the rotor blades. A steel tower is normally assembled by steel rings either bolted together or welded to each other. A concrete tower may be assembled from concrete parts joined together or may be made by sliding form casting.

These conventional towers work well but have some disadvantages. One disadvantage is that they are heavy. A heavy tower requires a very stable foundation, which in turn requires a lot of e.g. concrete. Due to efficiency, the wind power installations are often built in areas lacking roads, which complicate the transport of material to the site. Since large amounts of material are required for a tower, extensive transportation is required. A further disadvantage is when the life time of a tower is reached and the tower must be pulled down. In this case, all material must be handled and transported again.

A wooden tower has been proposed in WO 2010121733 A2. The proposed tower is built by using an inner frame made by plane elements connected with connection means, to which a load carrying coating is applied. The plane elements may be made from laminated plywood and/or wood composite materials.

WO 2016119059 A1 discloses a method for manufacturing curved laminated wood panels, where a wood panel comprises a plurality of veneer layers glued together. The veneer layers are laid out in a crosswise manner, with the wood grain orientation of each veneer layer being different from the adjacent veneer layers, e.g. by 90 degrees. The veneer layers are placed in a form and are pressed together to a curved wood panel.

EP 0532376 A2 discloses a method for producing circular wood tubes, where a plurality of veneer layers are glued and pressed together to a flat sheet, where the flat sheet is allowed to bend in a natural way to a semi-circular curved shape before the glue is set. Two semi-circular sheets are then glued together to form a tube.

These and other known towers may work well in some circumstances, but there is still room for an improved self-supporting wooden tower comprising a plurality of circular wooden sections.

DISCLOSURE OF INVENTION

An object of the invention is therefore to provide an improved laminated wood tower. A further object of the invention is to provide a method for assembling an improved laminated wood tower.

The solution to the problem according to the invention is described in the characterizing part of claim 1 for the laminated wood tower and in claim 14 for the method of assembling a laminated wood tower. The other claims contain advantageous embodiments and further developments of the laminated wood tower.

In a laminated wood tower comprising a plurality of curved modules attached to each other, where each curved module comprises a plurality of laminated wood layers, and where the curved module is elongated and straight in a longitudinal direction and curved in a width direction, the object of the invention is achieved in that that a laminated wood layer comprises a first set of plies, where the first set of plies comprises a plurality of plies arranged adjacent each other and where the wood grain is directed in a first direction, and a second set of plies, where the second set of plies comprises one or more plies arranged adjacent each other and where the wood grain is directed in a second direction, where the first direction is perpendicular to the second direction.

By this first embodiment of a laminated wood tower, a self-supporting wood tower is provided. By using a plurality of layers comprising a plurality of laminated plies, a laminated wood tower that will be able to withstand loads acting from any direction is provided. By using a plurality of laminated plies in each layer, a laminated wood tower that is lighter and stronger than comparable solid wooden towers is provided. The laminated wood tower is assembled from a plurality of curved modules, where a number of curved modules are assembled to a circular section. Several circular sections are mounted on each other such that a laminated wood tower is obtained.

One advantage of the invention is that the curved modules can be manufactured at a production plant, where a rational production of curved modules can be made under controlled environmental conditions. The curved modules can then be transported to a site for e.g. a wind turbine where the curved modules are assembled to circular sections and then to a laminated wood tower. The curved modules can be manufactured such that they will fit on an ordinary truck, which allows for an easy transport of the laminated wood tower. Further, the weight of the curved modules is relatively low, which simplifies the transport to remote areas where the roads are often of low quality or non-existent.

Each module is formed by laminating a plurality of laminated wood layers. Each laminated wood layer comprises a plurality of veneer plies or sheets. One example of a suitable laminated wood layer is a type of a Laminated Veneer Lumber (LVL) panel, which comprises a plurality of laminated plies, where the fibre orientation of a first set of veneer plies are aligned in the same direction, i.e. with the wood grain of the plies arranged with the same fibre orientation. The layer will further comprise a second set of plies comprising a single ply or several plies arranged adjacent each other arranged in a perpendicular direction, i.e. with the wood grain direction arranged 90 degrees to the wood grain orientation of the first set of plies. In this way, the layer will be possible to bend such that a curved module can be obtained. Since each layer will only comprise a single position with one or more plies arranged in a crosswise direction, it will be possible to bend each layer before they are laminated to each other.

The crosswise second set of plies, i.e. the set of plies having a grain direction perpendicular to the first set of plies of a layer, may be arranged at any position of the layer, but is preferably arranged close to one side of the layer. In one example, the layer comprises one or two plies arranged in a first direction, a single ply arranged in a second direction perpendicular to the first direction, and several, e.g. 5 plies, arranged in the first direction. The total number of plies in a layer may vary. A suitable number of plies in a layer may e.g. be in the range between 6 to 15 and may depend on the required thickness of a module and on the production process. A thinner layer is easier to bend, but more separate layers have to be bent which takes more time.

It is also possible to integrate another fibre composite material in a layer, such as a glass fibre or carbon fibre ply. It is also possible to provide a curved module with a plurality of reinforcement beams arranged in the longitudinal direction of the curved module, i.e. in the vertical direction of the curved module when mounted in a laminated wood tower. The beams are preferably rectangular with the short side attached to the inner surface of the curved module. The beam is preferably glued to the curved module. When two circular sections are mounted to each other, each beam will also be fixedly attached to an adjacent beam. One suitable joint is a metal plate that is glued in slits extending through both the beam and the curved module. The main purpose of the beams is to reinforce the curved modules. In this way, the curved modules can be made thinner which may save cost. The beams will mainly take up vertical forces, and the outer shell of laminated layers will take up vertical loads and twisting loads.

Wood, and especially spruce or pine, is a cheap and strong material suitable to be used for laminating layers from thin veneer plies. Other fibers may also be used, such as bamboo fibers, which may be laminated into layers with the fibers in a desired direction.

By this first embodiment of the laminated wood tower according to the invention, a self-supporting laminated wood tower is provided. By mounting a plurality of curved modules to each other in a sideway direction, circular sections are obtained, which are assembled into a laminated wood tower. The mounting of the curved modules to each other may be made with a specific joint, which may comprise e.g. rabbets. Rabbets of a curved module will cooperate with rabbets of an adjacent curved module, where the curved modules may lock to each other. It is also possible to use overlapping joints, where some layers of a curved module overlap some layers of an adjacent curved module. Finger joints or puzzle joints are also possible to use when mounting curved modules to each other. The curved modules may be mounted to each other with glue and screws. The circular sections may also be mounted to each other by using rabbets or joints with offset wooden layers. The curved modules may also be mounted to each other by the use of mounting brackets. A mounting bracket may be arranged at the edge of a curved module, e.g. in the curved module, and may be adapted to extend into an adjacent curved module. The mounting brackets may be mounted by using screws and/or glue.

A further type of joint that may be used is to glue perforated steel plates into slits arranged in the modules. In this type of joint, steel plates are inserted into slits cut or routed in a module, where a slit preferably is slightly wider than a perforated steel plate. Each steel plate comprises a plurality of holes in a predefined pattern. Glue is injected into the slit such that half of a steel plate is glued to a module. An adjacent module is provided with corresponding slits such that two modules can be connected to each other in a reliable way by gluing the steel plates to the adjacent module. The number of steel plates used for a module is defined by calculation of the required forces that the joint must withstand.

In a curved wooden module, several layers are laminated to each other to form the curved wooden module. A curved module may e.g. comprise nine laminated layers, where each layer may comprise e.g. seven veneer plies. In this example, the curved module will comprise a total of 63 veneer plies.

The layers are preferably pressed together in a press, where the curved wooden module is further shaped to the required shape in the same pressing step. It is also possible to form a curved module by bending a first layer to the desired shape, and to attach the other layers to the first layer by screws and glue. In this way, it is not necessary to press all layers to each other. The curved module is e.g. formed by nine layers. When a curved module has been pressed together, the rabbets or other joints and the side surfaces may thereafter be shaped by a precision router, such that relatively small tolerances are obtained. The small tolerances help to improve the stiffness and rigidity of an assembled circular section and thus of the wooden tower. A curved module may comprise an odd or an even number of layers, where each layer may comprises an odd or an even number of plies.

The curved modules may divide the circumference of a circular section in two, three, four, six, eight or more curved modules, depending mainly on the diameter of the laminated wood tower. It is preferred to use as few sections as possible for a laminated wood tower, which means that the maximal size of a curved module will be limited by the possibility to transport the curved modules to the building site. A circular section adapted to be positioned at a lower part of the tower may comprise more curved modules than a circular section adapted to be positioned at a top part of the tower. A further limiting factor is the handling of a curved module. It is more practical to use curved modules with a length between e.g. thirteen to twenty meters, but a curved module may be up to thirty meters long. Laminated wood towers of different sizes may be constructed with the inventive method. However, the inventive method is mainly advantageous for laminated wood towers of 50 meters and more, and is well suited for wind power towers of up to 150 meters and more. Also the width of a curved module may be limited by the transportation of the curved modules. It may thus be of advantage to divide the circumferential in more than four parts. The laminated wood tower may be straight or may be provided with tapered walls, such that the laminated wood tower is shaped as a truncated cone.

A laminated wood tower will be self-supporting. There is thus no need for a frame or any cross bar stabilizers inside the laminated wood tower. This means that the inner room of the laminated wood tower can be used for e.g. a lift or stairs. At the bottom of the laminated wood tower, the laminated wood tower is attached to a foundation. The foundation may be e.g. a steel construction to which the lowermost circular section is attached by e.g. hexagon head wood screws, or the lowermost circular section may be glued to the steel construction by using slits in the lowermost circular section. Preferably, a climate system is installed inside the laminated wood tower, which may control e.g. the temperature and the humidity of the interior of the tower. Any other equipment such as sensors or cable shafts can easily be installed by using wood screws.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims. The directional references used refer to directions of a circular section when used in a laminated wood tower.

Figure 1:
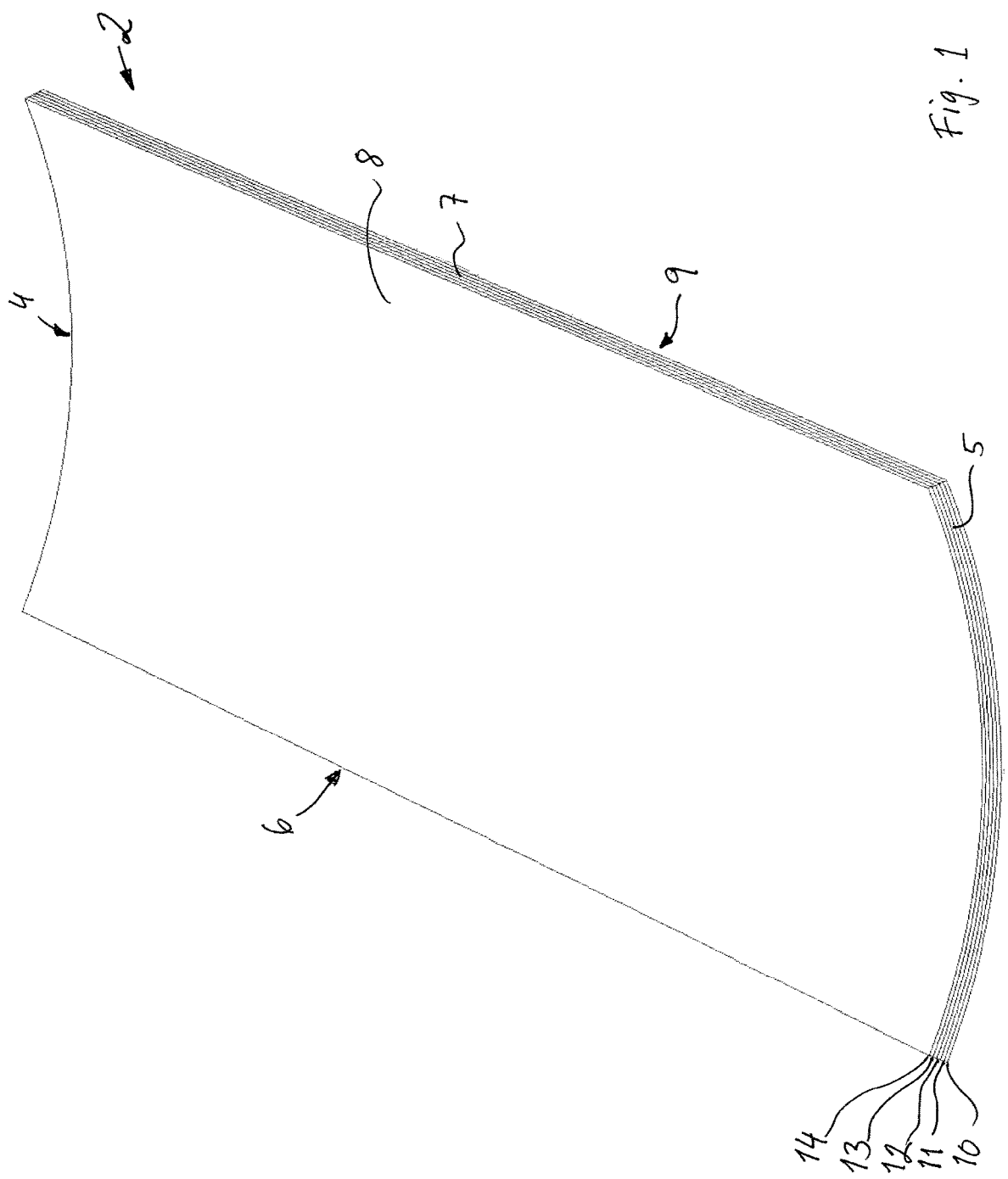
FIG. 1 shows an example of a module comprising a plurality of laminated layers for a laminated wood tower according to the invention.
Figure 2:
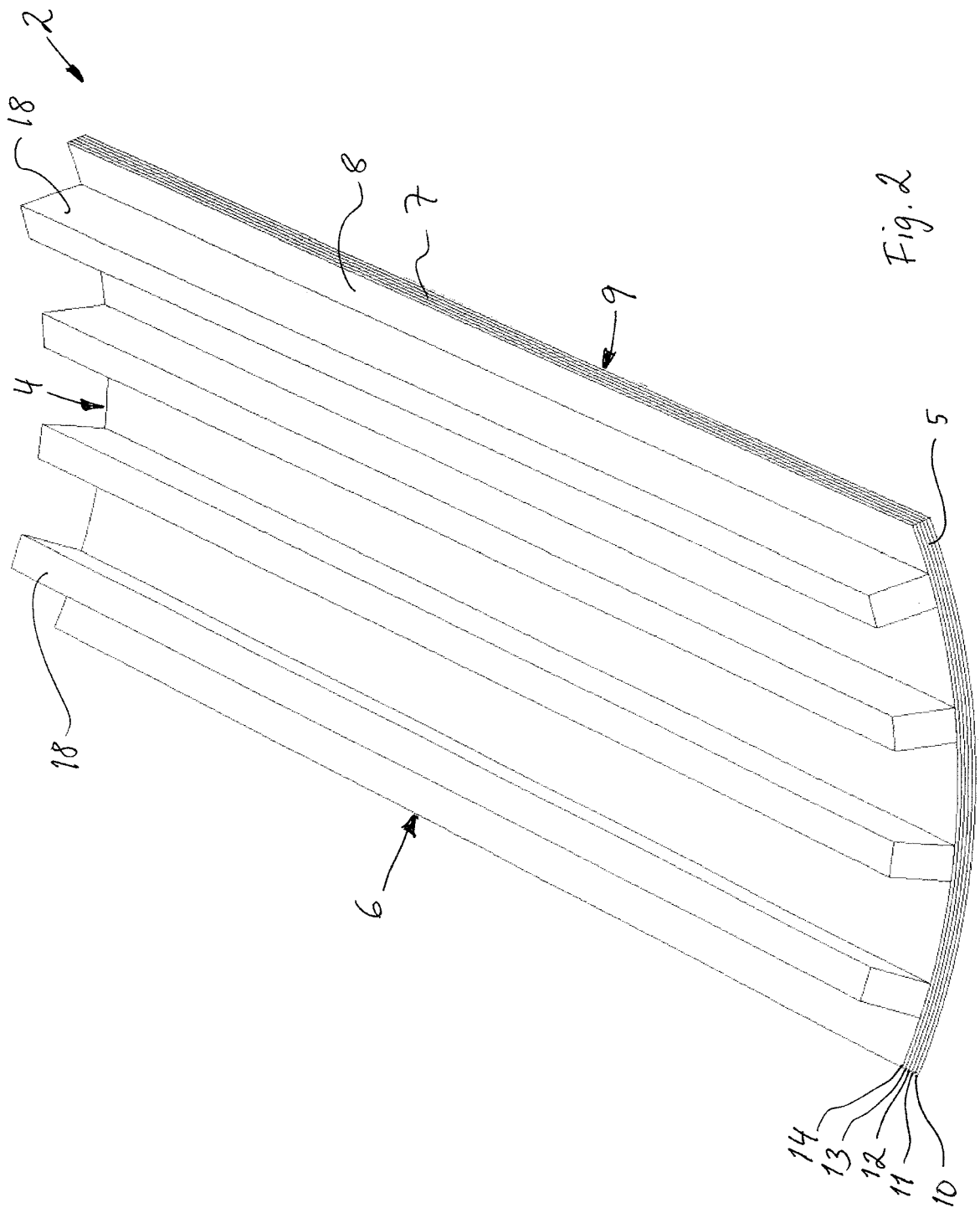
FIG. 2 shows an example of a module comprising a plurality of laminated layers and reinforcement beams for a laminated wood tower according to the invention.
Figure 3:
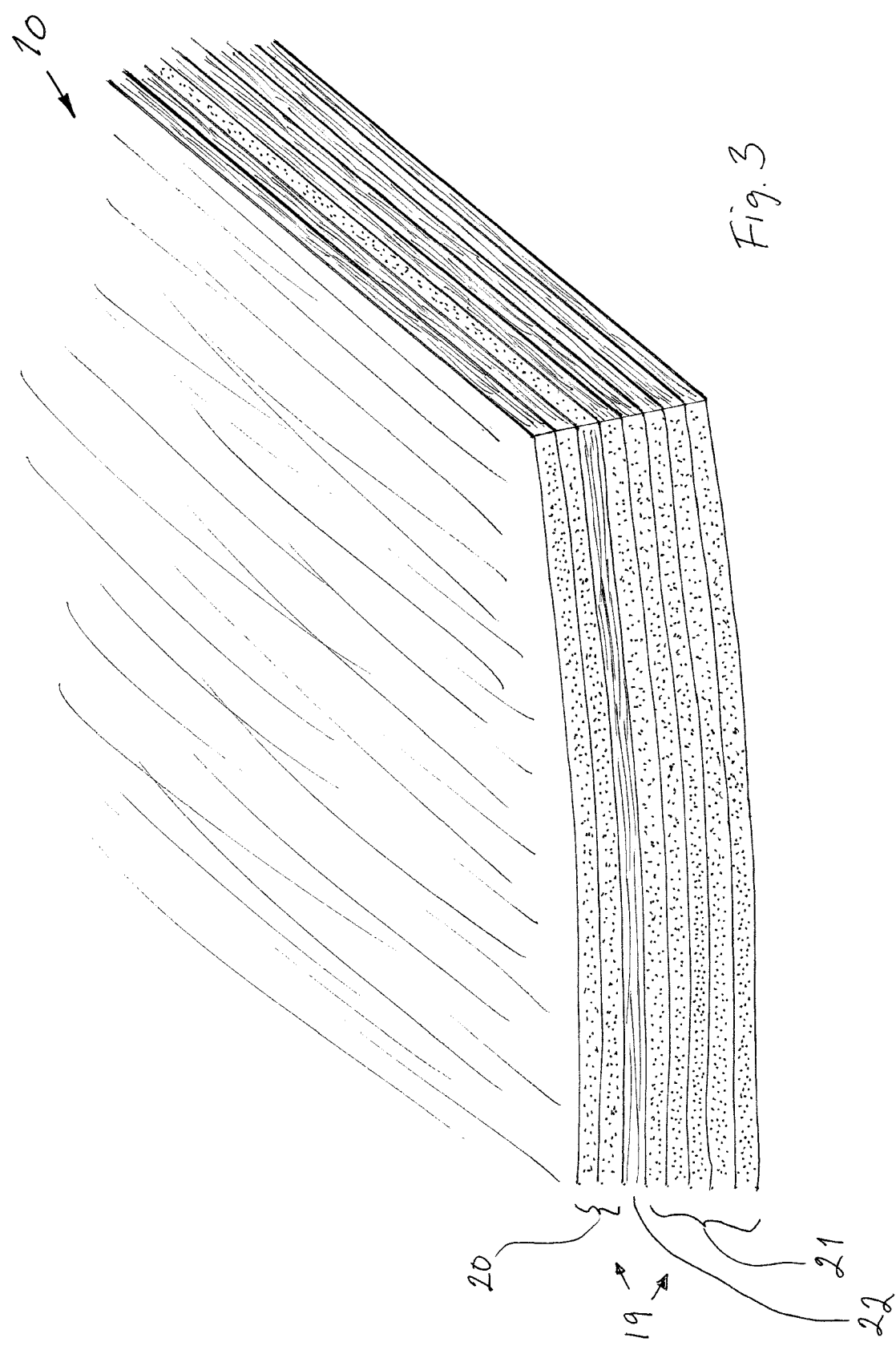
FIG. 3 shows an example of a laminated layer comprising a plurality of plies.
Figure 4:
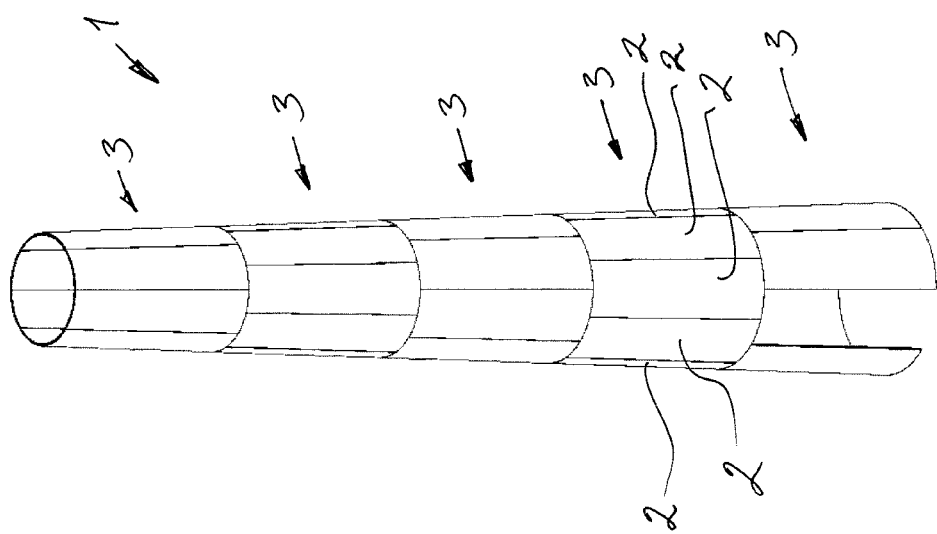
FIG. 4 shows an example of a laminated wood tower comprising a plurality of curved modules according to the invention.
Figure 5:
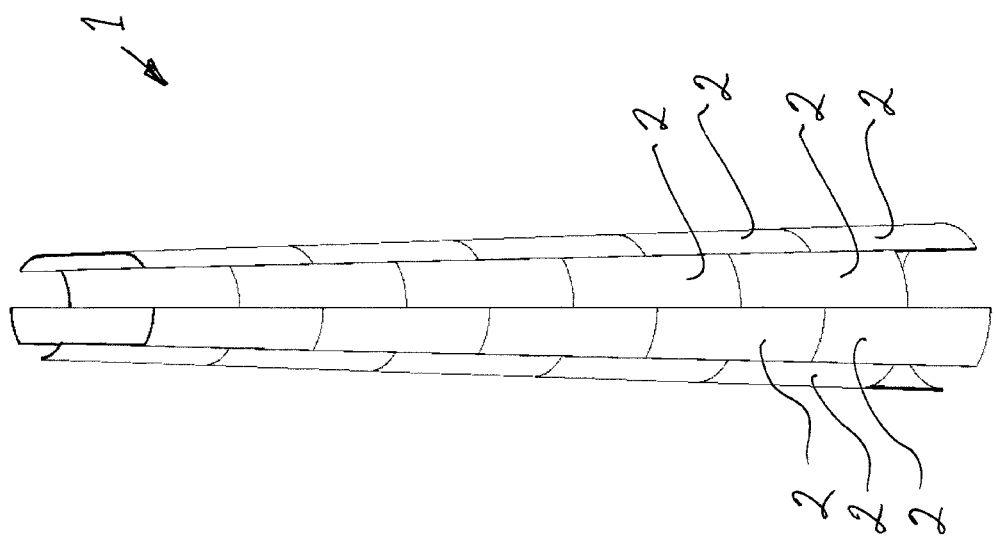
FIG. 5 shows another example of a laminated wood tower comprising a plurality of curved modules according to the invention.
Figure 6:
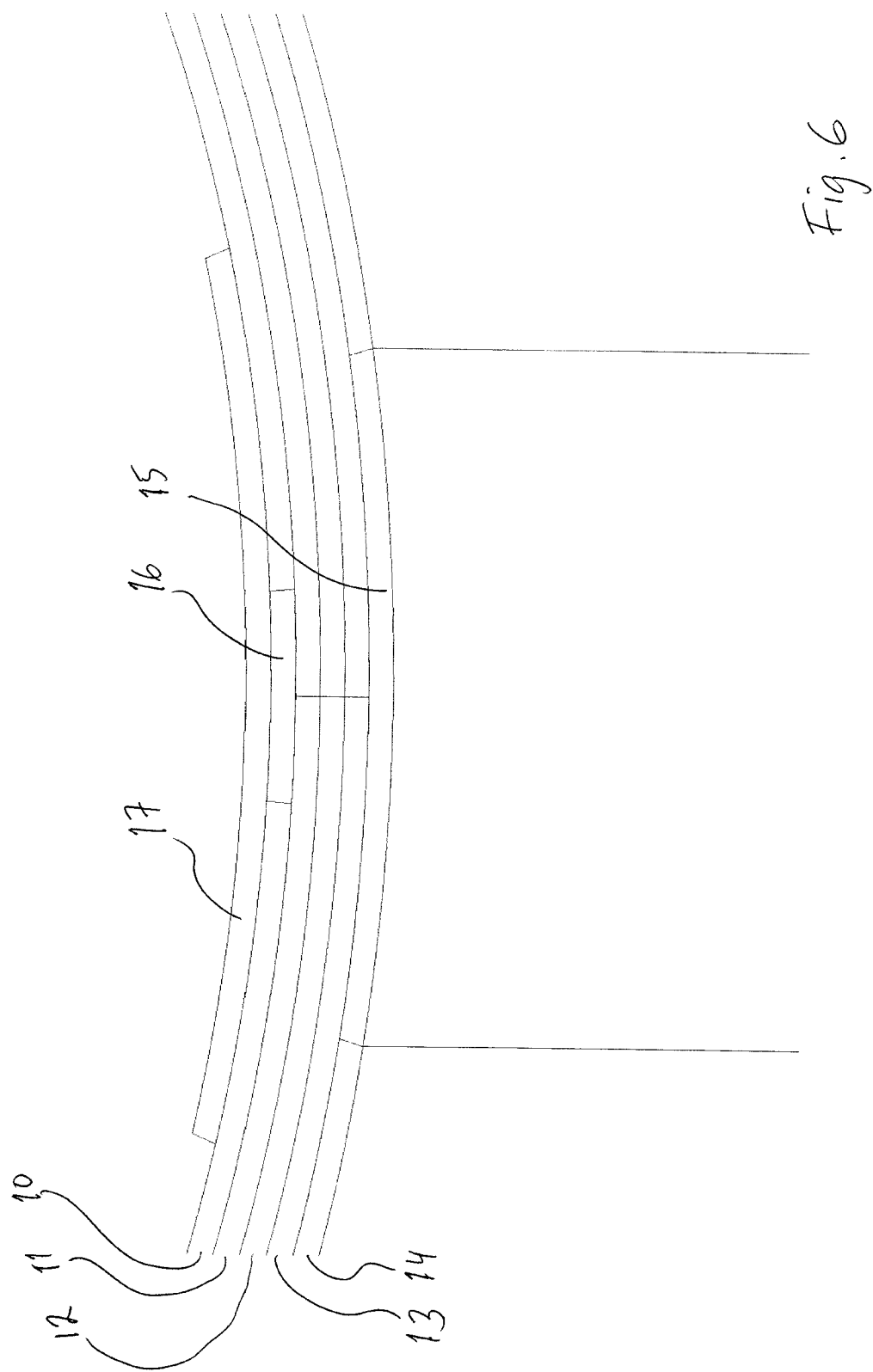
FIG. 6 shows an example of a vertical joint between two curved modules.
Figure 7:
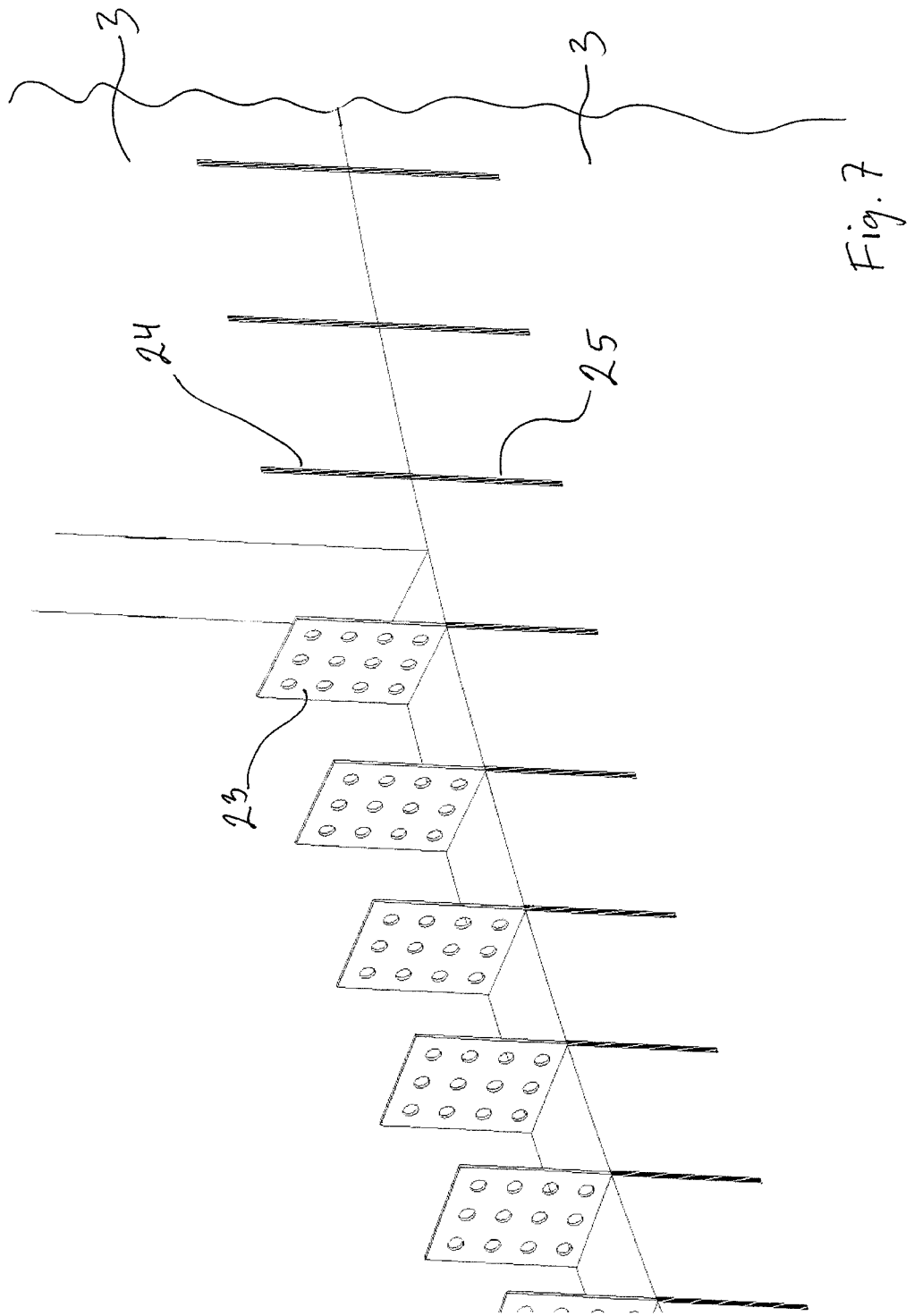
FIG. 7 shows an example of a horizontal joint comprising glued steel plates.
Figure 8:
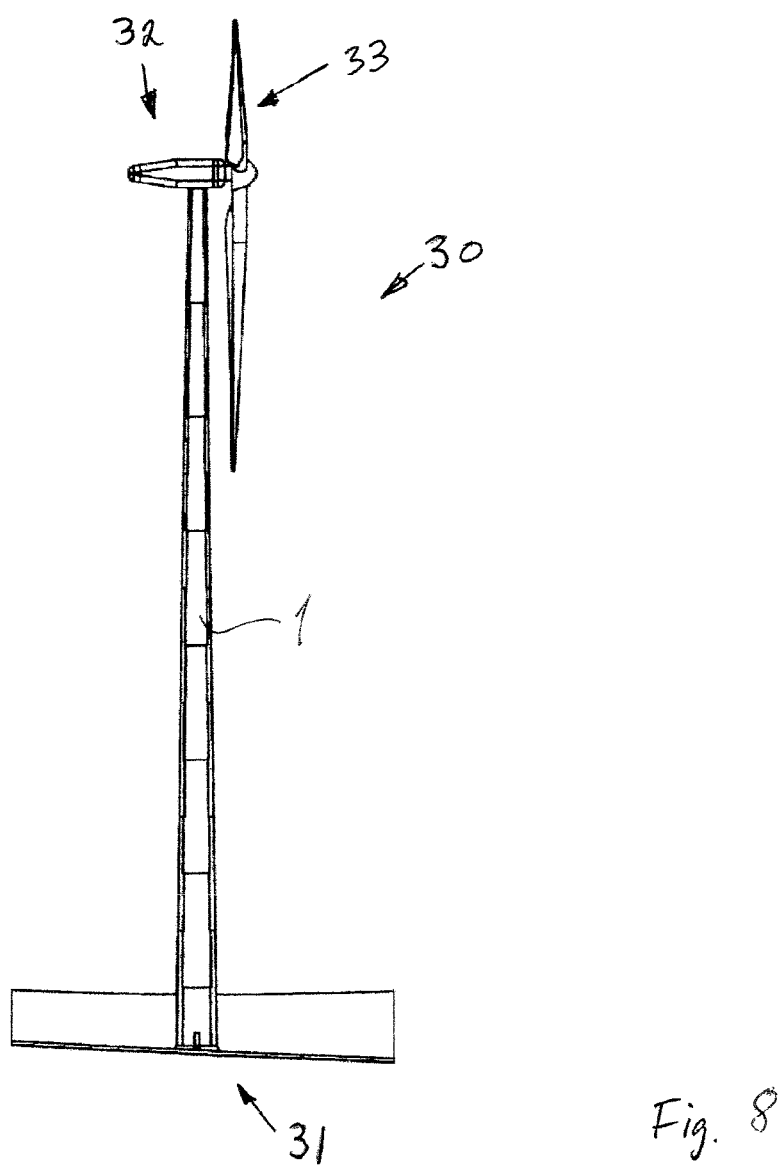
FIG. 8 shows an example of a wind power tower according to the invention.

FIG. 1 shows a first example of a curved module for a laminated wood tower, FIG. 2 shows a second example of a curved module for a laminated wood tower, FIG. 3 shows an example of a layer used in curved module, FIG. 4 shows a laminated wood tower comprising a plurality of circular sections, FIG. 5 shows another example of a laminated wood tower comprising curved modules, FIG. 6 shows an example of a vertical joint, FIG. 7 shows an example of a horizontal joint for assembling circular sections and FIG. 8 shows a wind power tower comprising a laminated wood tower.

A laminated wood tower 1 comprises a plurality of curved modules 2. The curved modules may be mounted to each other one by one in order to form the laminated wood tower, or the curved modules may be mounted to each other to form circular sections 3, where each circular section comprises a plurality of curved modules 2. The circular sections are then mounted to each other to form the laminated wood tower. The mounting of the curved modules to each other may be made with a specific joint, which could comprise e.g. rabbets of a curved module that cooperates with rabbets of an adjacent curved module, where the curved modules may lock to each other. It is also possible to use overlapping joints, where some layers of a curved module overlap some layers of an adjacent curved module. Finger joints or puzzle joints are also possible to use when mounting curved modules to each other. The curved modules may be mounted to each other in a sideway direction with glue and screws.

The circular sections may be mounted to each other by the use of perforated steel plates that are glued in slits provided in the circular sections. A steel plate is arranged in a slit in an upper or lower edge of a circular section and is adapted to extend into a slit in an adjacent circular section, where the perforated steel plate is adhered to the circular section by the use of a specific glue. Several steel plates are used for each circular section. It would also be possible to use such a joint to attach curved modules to each other.

The laminated wood tower 1 comprises a plurality of curved modules 2. The curved modules are preferably arranged as circular sections 3, as shown in FIG. 4, but may be arranged in an offset manner, where half a curved module is attached to a half of an adjacent curved module, as shown in FIG. 5. A curved module 2 comprises a plurality of laminated layers. In one example, shown in FIG. 1, the curved module comprises five layers, a first layer 10, a second layer 11, a third layer 12, a fourth layer 13, and a fifth layer 14. The layers are press glued to each other such that a solid curved module 2 is obtained. The curved module is provided with an upper edge 4, a lower edge 5, a first side edge 6, a second side edge 7, an inner surface 8 and an outer surface 9. In the shown example, the edges of a curved module are even.

A curved module 2 comprises several layers of laminated veneer plies. In a layer, the direction of the fibres of the veneer plies of a first set of plies 19 are directed in the same direction. The first set of plies contain most of the plies, and preferably at least 80% of the number of plies. A layer further comprises a second set of plies 22 comprising one or more plies with the direction of the fibres directed in a perpendicular direction when compared to the first set of plies. Preferably, the second set of plies comprise one ply, but may comprise two or more veneer plies arranged adjacent each other, or may comprise a thicker ply.

The second set of plies, i.e. the set of plies having a grain direction perpendicular to the first set of plies of a layer, may be arranged at any position of the layer, but is preferably arranged close to one side of the layer. In one example, the second set of plies is arranged as an outermost set of plies of a layer, i.e. the second set of plies will constitute the inner surface or the outer surface of a layer. In another example, the second set of plies is arranged within the first set of plies. A first part 20 of the first set of plies 19 is in this case arranged on one side of the second set of plies 22, and a second part 21 of the first set of plies 19 is arranged on the other side of the second set of plies 22.

In one example, shown in FIG. 3, a layer comprises eight plies. The first part 20 of the first set of plies 19 comprises two plies arranged with the wood grain direction in the first direction, the second set of plies 22 comprise a single ply arranged with the wood grain direction in the second direction perpendicular to the first direction, and the second part 21 of the first set of plies 19 comprises five plies arranged with the wood grain direction in the first direction. The number of plies in a layer may vary. A suitable number of plies in a layer may e.g. be in the range between 6 to 10 and may depend on the required thickness of a module and on the production process. It is important that there is only one position in which a ply is arranged in a perpendicular direction. If two or three plies are used for the crosswise ply, they must be adjacent each other with the grain direction in the same direction. Using a single set of plies arranged in a cross manner will strengthen the layer and will still allow the layer to be bent to a curved shape. A regular board having at least two plies arranged crosswise and which are spaced apart from each other will not be possible to bend without breaking the board.

The layers are pressed together in a glue press, where the final shape of the curved wooden module is obtained. The glue press may comprise a male or a female jig or template. The layers may be glued to each other one by one, or all layers are glued together at the same time. When a curved module has been glued together, the edges of the curved module are thereafter shaped to the desired shape, preferably to plane surfaces, by a precision router, such that relatively small tolerances are obtained. Other shapes such as rabbets or other joints are conceivable. The small tolerances help to improve the stiffness and rigidity of an assembled circular section and thus of the laminated wooden tower. By precision routing the joint surfaces, the end surfaces of each layer can also be used to strengthen the joint.

In the shown example, the curved modules 2 divide the circumference of a circular section 3 in eight curved modules. A laminated wood tower may be straight or may be provided with tapered walls, such that the laminated wood tower is shaped as a truncated cone. Each circular section may thus be straight where the diameter of the upper side of a circular section is equal to the diameter of the lower side of a circular section. Each circular section may also be shaped as a truncated cone, where the diameter of the upper side of a circular section is smaller than the diameter of the lower side of a circular section. The wood grain direction of the first set of plies is arranged in the longitudinal direction of a curved module.

A curved module is curved in a radial direction and straight in a longitudinal direction. A curved module is longitudinal, i.e. the length of the curved module in the longitudinal direction is greater than the width of the module in the radial direction. A projection of a curved module from the outer surface will resemble a rectangle where the long sides are either parallel or are somewhat inclined. Straight curved modules are preferred for straight wooden assemblies, such as storage tanks or tubes, and inclined curved modules are preferred when a laminated wood tower having a shape of a truncated cone is to be obtained. An assembled laminated wood tower will be able to withstand loads acting from any direction.

A curved module may also be provided with different kinds of joints. The side edges 6, 7 may e.g. be provided with a tongue or a groove, such that a tongue and groove joint is obtained between two adjacent curved modules. It is e.g. possible to provide the side edges with a double or stepped rabbet, such that a rabbet is provided with two rabbet edges provided at different heights, and two rabbet bottoms provided at different widths. FIG. 6 shows an example of a vertical joint where a part of the inner layer and a part of the outer layer of a curved module are left out from the curved module. An additional outer board 15, an additional inner filler board 16 and an additional inner board 17 are used to complete the joint. Glue and screws are used to connect the two curved modules to each other. The outer board and the inner board are preferably bent to the same curvature as the curved module.

A curved module will comprise wooden layers where a single set of veneer plies is oriented in a different direction, i.e. the wood fibres are directed in different directions. This is often referred to as cross lamination. In cross lamination, one wooden ply or more wooden plies will be directed in another direction, normally 90 degrees when flat panels are manufactured. The longitudinal wooden plies, i.e. the plies having the wood grains oriented in a vertical direction, will mainly handle vertical loads, both pushing and pulling loads. The cross wooden ply or plies will help to handle twisting loads acting on the tower. Since all plies are securely attached to each other, the wooden sections will be able to handle high loads in different directions. The curved modules may divide the circumference of a laminated wood tower in two, three, four, six, eight or more parts, depending mainly on the size of the tower.

A wooden layer is made from several veneer plies of thin wood. A veneer ply may be e.g. 3 mm thick, and with eight veneer plies a 24 mm thick layer is obtained. By using nine layers, a curved module being 216 mm thick is obtained. The number of used layers and the number of plies in a layer depends on the forces that the final construction must handle.

It is also possible to provide a curved module 2 with a plurality of reinforcement beams 18 arranged in the longitudinal direction of the curved module, i.e. in the vertical direction of the curved module when mounted in a laminated wood tower. In this example, shown in FIG. 2, a number of wooden beams 18 are arranged on the inner surface 8 of a curved module. In the shown example, the curved module, which extend over 45 degrees of the circumference of the tower, is provided with four beams. The beams are preferably rectangular with the short side attached to the inner surface of the curved module. The beam is preferably glued to the curved module, and the joint may also be provided with screws. The main purpose of the screws is to fixate the beam during the hardening of the glue.

When two circular sections are mounted to each other, each beam will also comprise a joint that attaches the beams to each other. One suitable joint is a perforated steel plate that is glued in slits of each beam. The main purpose of the beams is to reinforce the curved modules. In this way, the curved modules can be made thinner which may save cost. The beams will mainly take up vertical forces, and the outer shell of laminated layers will take up vertical loads and twisting loads.

The curved modules 2 are preferably mounted to each other to form a circular section 3. The circular sections are mounted to each other to form a laminated wood tower 1. The horizontal joints between two circular sections may also be made in different ways, e.g. by offsetting the layers of the curved module. The joints are glued and screwed together.

It is also possible to mount the curved modules 2 to each other with an offset in the vertical direction, as is shown in FIG. 5. In this example, every other curved module at the bottom of the tower will have half the height of a curved module. The horizontal joints of two adjacent curved modules will in this case be offset. This may strengthen the completed tower, but may be more labour intensive when the laminated wood tower is erected.

An assembled laminated wood tower will be self-supporting. There is thus no need for a frame or any cross stabilizers inside the wooden tower. It is preferred to use as few circular sections as possible for a laminated wood tower, which means that the maximal size of a circular section may be limited by the possibility to transport the curved modules to the building site. A further limiting factor is the handling of the curved modules. It is more practical to use curved modules with a length between thirteen to twenty meters. Laminated wooden towers of different sizes may be constructed with the inventive method. However, the inventive method is mainly advantageous for laminated wooden towers of 50 meters height and more, and is well suited for wind power towers of up to 150 meters and more. The width of a curved module may also be limited by the transportation of the curved modules. The width of a curved module may thus e.g. be between 2.5 to 3.5 meters, depending on local transport regulations. It may thus be of advantage to divide the circumferential in more than four parts. An assembled laminated wood tower may also be provided with an outer protective coating, which may e.g. be a paint or a plastic foil adapted to protect the laminated wood tower. A plastic foil is preferably applied to the laminated wood tower when the laminated wood tower is assembled, such that there is no gaps or slits in the protective coating.

FIG. 4 shows an example of a laminated wood tower 1 comprising five circular sections 3. The assembly of a laminated wood tower starts with placing a first circular section 3 on a foundation. Thereafter, a second circular section 3 is placed on the upper side of the first circular section 3. This is repeated until all circular sections have been mounted to each other. The curved modules of two adjacent circular sections are preferably offset, such that the vertical joints of two adjacent circular sections are not aligned with each other.

FIG. 7 shows an example of a suitable joint using a perforated steel plate 23. This joint may be used both to mount curved modules to each other and to mount circular sections to each other. In the shown example, the joint is used to connect two circular sections. Each joint comprises a perforated steel plate 23, which is arranged in a first slit 24 of a first circular section and in a second slit 25 arranged in a second circular section. With the perforated steel plate in place, the slits are filled with a specific glue such that the perforated steel plate will adhere to the wood. The perforation will further create a number of pegs through the holes that will increase the strength of the connection.

FIG. 8 shows an example of a wind power tower 30 comprising a laminated wood tower 1. The shown wind power tower may be up to 100 meters and more, and is in the shown example tapered somewhat towards the top of the tower. The tower is fixed to a foundation 31. The tower may be fixated to the foundation by attaching an interface made of steel to the tower. The steel interface may e.g. be glued to the tower, and will comprise attachment means adapted to cooperate with an interface of the foundation. In this way, the attachment of the tower to the foundation will be simplified. The same type of interface may also be used to attach the nacelle to the upper part of the tower. A door is provided in one of the lower curved modules. On top of the tower, a nacelle 32 comprising a rotor 33 and a generator is provided. Depending on the type of generator used, a transmission may also be installed.

Since the laminated wood tower is self-supporting, the inner room of the laminated wood tower can be used for different installations, such as a lift or stairs and cable racks. Since the inside is made of wood, any installation is easily fastened by using wood screws. At the bottom of the laminated wood tower, the laminated wood tower is attached to a foundation. The foundation may be e.g. a steel construction to which the lowermost circular section is attached. Preferably, a climate system is installed inside the laminated tower, which can control the humidity of the wood.

The laminated wood tower is preferably covered by a protective layer of some sort. The protective layer may e.g. be a suitable film or foil, such as a PVC film that is applied on the tower after it is erected. The protective layer may also be e.g. a thermosetting polymer, resin or plastic, or a two-component compound such as polyurea, that is applied to the outer surface of the tower. The polymer or compound may be applied to the outer and/or inner side of a module at the production plant, before the laminated wooden tower is erected. In this case, the seams will be sealed after the laminated tower is erected. This will help to protect the laminated wood tower from environmental influences, such as humidity, which will simplify the control of the humidity balance in the laminated wood tower. Other types of surface protection are also possible.

A laminated wood tower may also be used for other types of assemblies. It is e.g. possible to provide a circular tank or cistern by mounting a plurality of circular sections to each other. Such a circular tank may e.g. be used to hold water or other liquids. By placing a plastic foil on the inner surface of the tank, the circular sections are protected from the stored liquid. One use for such a tank could be a heat storage, where a large quantity of heated water is stored for later use. Such a tank may have a diameter of more than 50 meters, but due to the use of circular sections comprising laminated layers, the tank will be able to handle the load.

The invention is not to be regarded as being limited to the embodiments described above, a number of additional variants and modifications being possible within the scope of the subsequent patent claims. A circular section may be used for other circular objects, such as wooden tubes, and may have various sizes.

REFERENCE SIGNS

1: Laminated wood tower
2: Curved module
3: Circular section
4: Upper edge
5: Lower edge
6: First side edge
7: Second side edge
8: Inner surface
9: Outer surface
10: First layer
11: Second layer
12: Third layer
13: Fourth layer
14: Fifth layer
15: Outer panel
16: Filler panel
17: Inner panel
18: Beam
19: First set of plies
20: First part of first set of plies
21: Second part of first set of plies
22: Second set of plies
23: Perforated steel plate
24: First slit
25: Second slit
30: Wind power tower
31: Foundation
32: Nacelle
33: Rotor

The invention claimed is:

1. A laminated wood tower, comprising:
a plurality of curved modules attached to each other, where each curved module comprises a plurality of laminated wood layers, and where the curved module is elongated and straight in a longitudinal direction and curved in a width direction, wherein each of the laminated wood layers comprises a first set of plies, where the first set of plies comprises a plurality of first plies and where the wood grain of each of the first plies is directed in a first direction, and a second set of plies, where the second set of plies comprises one or more second plies arranged adjacent each other and where the wood grain of each of the second plies is directed in a second direction, where the first direction is perpendicular to the second direction.

2. The laminated wood tower according to claim 1, wherein the second set of plies is arranged as an outermost set of plies on each layer, and that all plies of the first set of plies are arranged adjacent each other.

3. The laminated wood tower according to claim 1, wherein the second set of plies is embedded inside the first set of plies, such that a first part of the first set of plies is arranged on one side of the second set of plies, and a second part of the first set of plies is arranged on the other side of the second set of plies.

4. The laminated wood tower according to claim 1, wherein the first set of plies comprises at least five plies.

5. The laminated wood tower according to claim 1, wherein the thickness of each of the first plies is between 1-5 mm.

6. The laminated wood tower according to claim 1, wherein one or more of the laminated wood layers comprises between 6-15 plies.

7. The laminated wood tower according to claim 1, wherein one or more of the curved modules comprises at least five laminated wood layers.

8. The laminated wood tower according to claim 1, wherein one or more of the curved modules further comprises a plurality of straight beams arranged spaced apart on an inner surface of the respective curved module, in the longitudinal direction of the curved module.

9. The laminated wood tower according to claim 1, wherein at least two curved modules are attached to each other to form a circular section that extends over the circumference of the laminated wood tower.

10. The laminated wood tower according to claim 1, wherein the height of the laminated wood tower comprises at least four curved modules.

11. The laminated wood tower according to claim 1, wherein the diameter of the upper edge of the tower is equal to the diameter of the lower edge of the tower.

12. The laminated wood tower according to claim 1, wherein the tower is frusto-conical, such that the diameter of the upper edge of the tower is smaller than the diameter of the lower edge of the tower.

13. The laminated wood tower according to claim 1, wherein the vertical joint of a curved module of a circular section is offset with respect to the vertical joint of an adjacent curved module of an adjacent circular section.

14. A method for assembling a laminated wood tower according to claim 1, where the method comprises the steps of:
fixedly the plurality of curved modules to each other to form a circular section,
repeating the step of fixedly attaching the plurality of curved modules to each other to form a circular section until all required circular sections are produced,
placing a first circular section on a base for the laminated wood tower,
placing a further circular section on the first circular section and attaching the further circular section to the first circular section,
repeating the step of placing a further circular section on the previous circular section, and
attaching the further circular section to the previous circular section to form the laminated wood tower.

15. A laminated wood tower, comprising:
a plurality of curved modules attached to each other, where each curved module comprises a plurality of wood layers laminated to one another, and where the curved module is elongated and straight in a longitudinal direction and curved in a width direction,
wherein each of the wood layers comprises a first set of veneer plies, where the first set of veneer plies comprises a plurality of first veneer plies and where the wood grain of each of the first veneer plies is directed in a first direction, and a second set of veneer plies, where the second set of veneer plies comprises one or more second veneer plies arranged adjacent each other and where the wood grain of each of the second veneer plies is directed in a second direction, where the first direction is perpendicular to the second direction.

* * * * *